Oct. 28, 1969  E. F. GROOVER ET AL  3,474,490

APPARATUS AND METHOD FOR PROCESSING POULTRY

Filed Sept. 18, 1968  2 Sheets-Sheet 2

INVENTORS.
JOHN H. WOOD,
GUY T. REID,
EDWIN F. GROOVER,
ROGER H. PHARR,
& CHARLES A. MIZE

Bailey & Dority

ATTORNEYS.

United States Patent Office 3,474,490
Patented Oct. 28, 1969

3,474,490
APPARATUS AND METHOD FOR PROCESSING POULTRY
Edwin F. Groover, 110 Wells Drive, Athens, Ga. 30601; Guy T. Reid, Rte. 1, Colbert, Ga. 30628; John H. Wood, 145 Herman St., and Roger H. Pharr, 229 Davis Estate Road, both of Athens, Ga. 30601; and Charles A. Mize, Watkinsville, Ga. 30677
Filed Sept. 18, 1968, Ser. No. 760,449
Int. Cl. A22b 3/08; A22c 21/00
U.S. Cl. 17—1                                   4 Claims

ABSTRACT OF THE DISCLOSURE

In a poultry processing line an insulated elongated electrode plate means over which the poultry is dragged after killing, and means establishing an electrical potential across the poultry when received on the elongated electrode plate means sufficient to relax the poultry, but insufficient to damage the poultry, said means establishing an electrical potential including a variable voltage transformer means.

This invention relates to electrical devices useful in poultry processing, including improved circuitry and improved method and means for applying electric shock to the poultry.

Many attempts have been made to stun poultry during processing through the use of eletcric shock, the purpose being to relax the poultry, stop fluttering and jumping of the poultry thereby avoiding breaking of wings and otherwise, bruising the poultry. Prior attempts have never been adapted into substantial commercial use. Prior art devices, such as those disclosed in the following United States patents, contemplate the application of electric shock before or when killing: 2,210,376, issued Aug. 6, 1940, to P. Onorato et al.; 2,306,773, issued Dec. 29, 1942, to E. R. Biffinger; 2,536,220, issued Jan. 2, 1951, to W. W. Rabin; 2,621,362, issued Dec. 16, 1952, to G. C. Cosden; 2,687,550, issued Aug. 31, 1954, to R. L. Coleman; and 2,879,539, issued Mar. 31, 1959, to C. M. Cervin. Devices which impart the shock to the poultry after killing include transverse bar electrodes such as in the disclosure of United States Patent No. 2,335,993, issued Dec. 7, 1943, to A. D. Bland et al., and electrified knives, such as in the disclosure of United States Patent No. 2,814,068, issued Nov. 26, 1957, to R. D. Pitts.

Accordingly, it is an important object of this invention to provide a practical apparatus and method of stunning poultry during processing through the use of electric shock.

Another important object of the invention is to provide electrode means utilizing blood from the poultry, after killing, to insure continuity of effective contact to relax the poultry sufficient to avoid injurious fluttering but avoid damage to the poultry as would result from an excessive shock.

Another object of the invention is the provision of improved circuitry effective for stunning but which easily and effectively controls the power expended in shocking the poultry to avoid damage thereto as might result should excessive power be employed.

Still another important object of the invention is the provision of a novel means and method for applying electric shock to poultry such that condemnation of poultry is reduced, picking of the poultry is facilitated leaving a better bloom thereon, as well as avoiding inhalation of scald vat water by the poultry.

The construction designed to carry out the invention will be hereinafter described, together with other features thereof.

Figure 1:
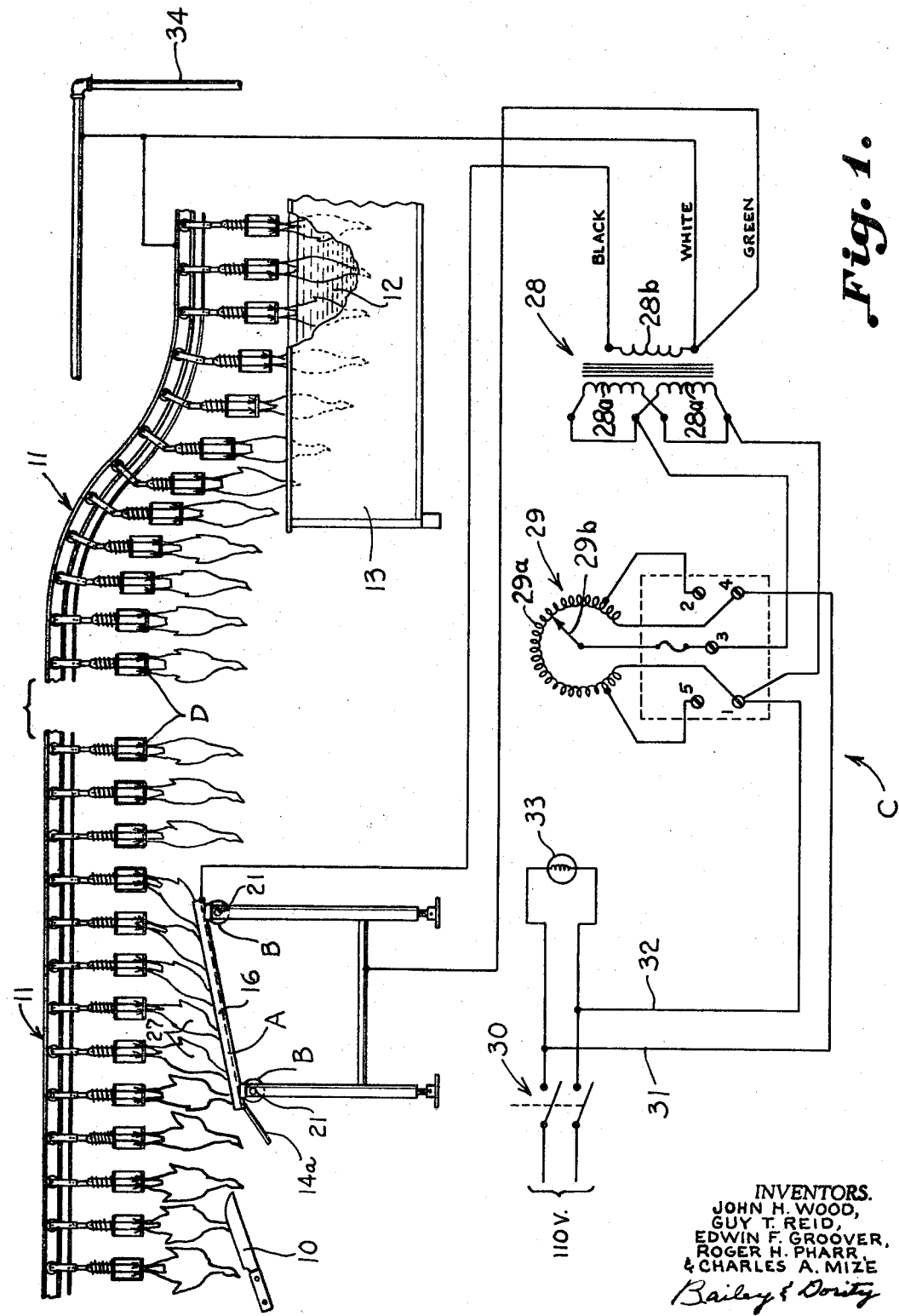
Figure 2:
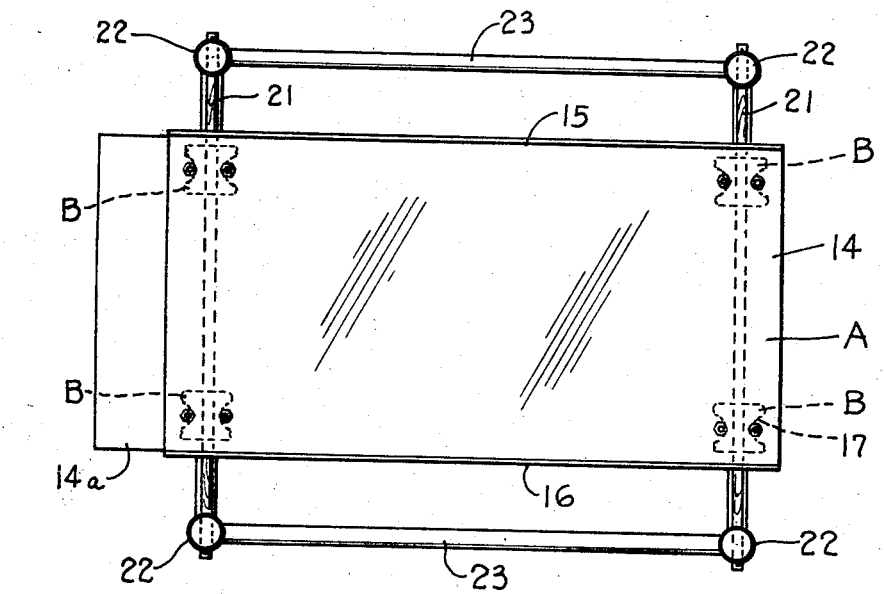
Figure 3:
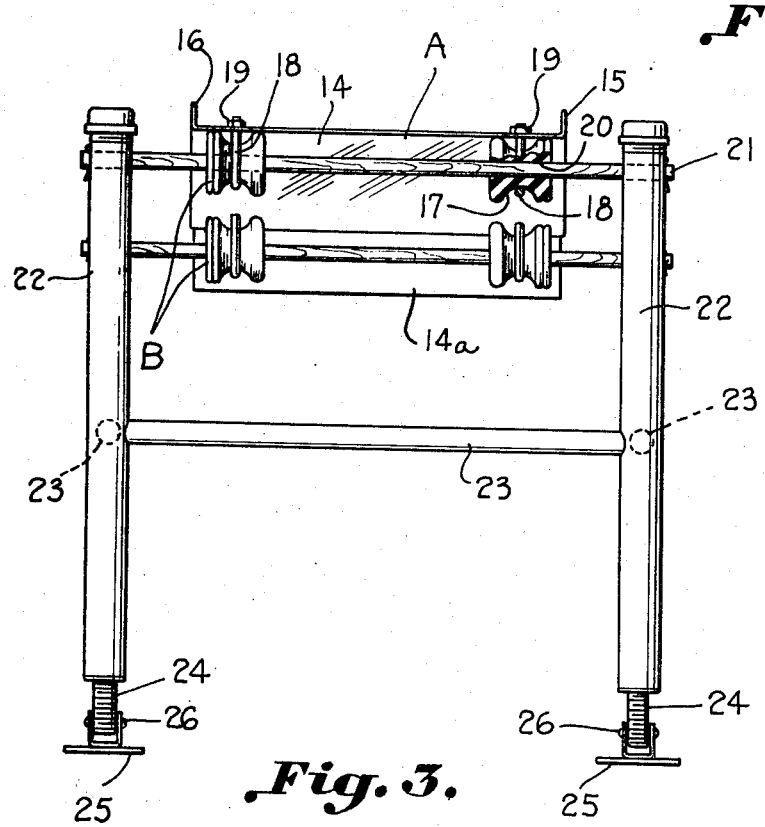

The invention will be more readily understood from a reading of the following specification and by reference to the accompanying drawings forming a part thereof, wherein an example of the invention is shown and wherein:

FIGURE 1 is a schematic side elevation illustrating a poultry processing line embodying apparatus and method in accordance with the present invention including a diagram of electrical circuitry, FIGURE 2 is a top plan view illustrating an elongated electrode plate means and insulating means mounting the plate in accordance with the invention, and FIGURE 3 is a rear elevation, looking toward the left-hand end of the means illustrated in FIGURES 1 and 2, with a part broken away.

In the drawings, FIGURE 1 illustrates a poultry processing line including a killer station where the poultry is cut for bleeding, a scald bath, and a conveyor for continuously moving the poultry suspended by the feet with the heads down to the killer station and thence to the scald bath preparatory to picking. The conveyor has a run between the killer station and the scald bath for permitting bleeding of the poultry after killing at the killer station and prior to subjection of the poultry to the scald bath. FIGURES 1, 2 and 3 illustrate an elongated electrode plate means A for establishing continuous electrical contact with the poultry. Electrical insulating means B mount the elongated electrode plate means below the conveyor and in the processing line for receiving the poultry after killing so that the poultry is dragged thereon spilling blood on and continuously contacting the elongated electrode plate so as to establish electrical contact therewith. Circuitry means C is provided for establishing an electrical potential across the poultry when received by the elongated electrode plate means sufficient to relax the poultry for avoiding injury thereto, but insufficient to damage the poultry. The conveyor has conductive material D in electrical contact with the poultry for placing the poultry across said electrical potential between the elongated electrode plate means and the conveyor. Thus, injuries to the poultry as result from fluttering after the poultry passes the killer station are reduced and picking is facilitated.

The poultry processing line has a killer station schematically illustrated in FIGURE 1 by the knife designated at 10. Operators, known as killers, cut the poultry for bleeding at the killer station, usually by cutting the jugular vein in the throats of the poultry. This operation is known as "killing."

A conveyor of the usual type, broadly designated at 11, continuously moves the poultry suspended by the feet with the heads down to the killer station and thence to the scald bath 12 carried in the scald tank or vat 13. The conveyor normally carries about 126 birds per minute past a given point and travels about 63 feet per minute. The conveyor has a run betwen the killer station 10 and the scald bath 12 for permitting bleeding of the poultry after killing at the killer station and prior to subjection of the poultry to the scald bath.

The elongated electrode plate means A is illustrated as including an intermediate plate portion 14 between turned up longitudinal sides 15 and 16. The portion 14 is elongated and aligned lengthwise with the conveyor of the processing line, as illustrated. It has been found that a length of from about 8 inches to about 36 inches is satisfactory for the portion 14, although it is possible that other lengths would also be acceptable. A preferable length is 28 inches. Preferably, the elongated electrode plate means A is imperforate and tilted as illustrated to permit collection thereon of sufficient blood to insure a good electrical contact between the poultry dragged thereover, but which removes excess blood by gravity. The intermediate plate portion 14 may also be provided with a downturned rearward projection 14a for facilitating reception of the poultry and removal of blood. Thus, the plate means A is generally in the form of a tilted trough means.

Electrical insulating means B include spool insulators, each having a central longitudinal groove 17 for accommodating a U-bolt 18, the legs of which pass upwardly through the intermediate plate portion 14. The free-ends of the legs of the U-bolts are each threaded to receive a nut 19. Each spool insulator has a transverse bore 20 for receiving a transverse mounting rod 21, preferably constructed of insulating material. It will be noted that a spool insulator is positioned adjacent each corner of the elongated electrode plate means A. Thus, a pair of longitudinally spaced transverse bars 21 each support a pair of transversely spaced spool insulators. The bar 21 nearest the killer station 10 is lower than the opposed forward bar 21.

Each of the bars 21 is carried between a pair of vertical legs 22 which form a vertical support means therewith for the elongated electrode plate A. The legs 22 may be constructed of electrically conductive material and braced as by horizontal bars 23 intermediate their ends. The lower end of each of the legs 22 has an internally threaded vertical bore (not shown) for receiving a threaded shank 24 for vertical adjustment of a base plate 25 pivotally carried thereby as at 26. The table-like support described above may be thus accommodated to an uneven floor and provide vertical adjustment for the elongated electrode plate means A. Such is preferably positioned closely adjacent the killer station to minimize the chance of injury to the birds. It will be noted in FIGURE 1 that the birds thrash about until they are relaxed through contact with the elongated electrode plate means A.

Thus, the electrical insulating means B mounts the elongated electrode plate means A below the conveyor and in the processing line for receiving the poultry after killing so that the poultry 27 is dragged thereon and thereover, as illustrated in FIGURE 1, spilling blood on and continuously contacting the elongated electrode plate so as to establish electrical contact therewith.

Means C is provided for establishing an electrical potential across the poultry when received by the elongated electrode plate means A sufficient to relax or quiet the poultry for avoiding injury thereto, but insufficient to damage the poultry. Means C includes a transformer 28 and a variable voltage transformer 29. A two pole toggle switch 30 is illustrated as energizing the lines 31 and 32 from a 110 volt A.C. supply. A lamp 33 is placed across the lines to indicate when the circuit is energized, serving as warning to avoid shocking operators. The transformer 28 is a step-up transformer and may be of the type exemplified by Model 9T55Y55G1 of the General Electric Company of Schenectady, N.Y. The variable transformer means 29 may include an auto-transformer of toroidal core design with a movable brush-tap to deliver an infinitely variable output voltage, within limits, in this case from 0 to 100%, output voltage from A.C. power lines. Such may be a Powerstat, trademark of the Superior Electric Company of Bristol, Conn., of the 136B type. All the transformer means may possibly be included in a single element.

It will be observed that the primary of the transformer 28 includes parallel windings 28a and that the secondary 28b has its high potential side connected through the black lead to the elongated electrode plate A while the low side is grounded through the white lead to a water pipe 34 and the shackle lines of the conveyor 11. The green lead is connected to a brace 23 from the legs 22. The variable transformer means 29 includes the coil 29a and the brush-tap 29b. The conveyor 11 has conductive material D including hangers and hanger lining.

Test results, using an electrode plate 28 inches long, taken on successive days on chickens are as follows:

| Powerstat Setting, Percent | Voltage, Volts | Birds Relaxed, Percent |
| --- | --- | --- |
| 25 | 50 | 25 |
| 35 | 75 | 60 |
| 45 | 95 | 75 |
| 55 | 120 | 100 |
| 65 | 140 | 100 |
| 75 | 165 | ¹ 100 |
| 40 | 95 | 65 |
| 45 | 110 | 75 |
| 50 | 120 | 98 |
| 55 | 130 | 100 |

¹ Slight damage to birds.

Variations are to be expected, depending upon size of birds, humidity conditions, etc. Larger chickens and turkeys would be expected to require higher settings. Tests indicate that by wetting chickens prior to killing; subjection thereof to the electrode plate, may under favorable conditions otherwise, result in as many as 75% of the birds being properly relaxed without damage thereto. It has been found that if the length of the electrode plate is reduced to 3 inches 50% of the chickens may be properly relaxed under otherwise favorable conditions. It has been further found that subjection of chickens to line voltage, 110 A.C., eliminating the transformers, is less effective in relaxing the chickens and damage to the chickens occurs including bursted hearts and livers.

It is thought that, since the amount of power necessary to anesthetize or relax poultry is relatively small, the line power must be limited as by the transformer means. Transformer means or other means are thought necessary for limiting the power without serious limitation on the voltage.

Blood is a good conductor and voltage levels within limits are necessary for good results at any given time in view of the inherent variable factors. A variable voltage transformer would reduce the power and avoid a large current as may damage the internal organs of the poultry.

It is, therefore, desirable that the system supplying power to the poultry possess the characteristics of variable output, power limitation and inductance to lower the power factor. The inductance is supplied by the coils of the transformer means. It is thought that voltage spikes resulting from the impedance are desirable, since they are low in power and tend to break down resistance in the bodies of the poultry. In addition to limiting the power applied to the poultry, the transformers serve as an isolation transformer, reducing shock hazards to personnel.

While a preferred embodiment of the invention has been described using specific terms, such description is for illustrative purposes only.

What is claimed is:

1. In a poultry processing line including a killer station where the poultry is cut for bleeding, a scald bath, and a conveyor for continuously moving the poultry suspended by the feet with the heads down to the killer station and thence to the scald bath, said conveyor having a run between the killer station and the scald bath for permitting bleeding of the poultry after killing at the killer station and prior to subjection of the poultry to the scald bath, the improvement comprising: an elongated electrode plate means for establishing continuous electrical contact with the poultry; electrical insulating means mounting the elongated electrode plate means below the conveyor and in the processing line for receiving the poultry after killing so that the poultry is dragged thereon spilling blood on and continuously contacting the elongated electrode plate so as to establish electrical contact therewith; means for establishing an electrical potential across the poultry when received by the elongated electrode plate means sufficient to relax the poultry for avoiding injury thereto but insufficient to damage the poultry; said plate being of sufficient length establishing sufficient potential across the poultry to relax the poultry; and said conveyor having conductive material in electrical contact with the poultry for placing the poultry across said electrical potential between the elongated electrode plate means and the conveyor; whereby injuries to the poultry as result from fluttering after the poultry passes the killer station are reduced and picking is facilitated.

2. The structure set forth in claim 1, wherein said elongated electrode plate means is substantially imperforate and tilted upwardly toward the scald bath for faciliating reception of the poultry thereby and for removing excess blood.

3. In a poultry processing line including a killer station where the poultry is cut for bleeding, a scald bath, and a conveyor for continuously moving the poultry suspended by the feet with the heads down to the killer station and thence to the scald bath, said conveyor having a run between the killer station and the scald bath for permitting bleeding of the poultry after killing at the killer station and prior to subjection of the poultry to the scald bath, the improvement comprising: an elongated electrode plate means for establishing continuous electrical contact with the poultry; electrical insulating means mounting the elongated electrode plate means below the conveyor and in the processing line for receiving the poultry so that the poultry is dragged thereon continuously contacting the elongated electrode plate so as to establish electrical contact therewith; means for establishing an electrical potential across the poultry when received by the elongated electrode plate means sufficient to relax the poultry for avoiding injury thereto but insufficient to damage the poultry including variable transformer means; and said conveyor having conductive material in electrical contact with the poultry for placing the poultry across said electrical potential between the elongated electrode plate means and the conveyor; whereby injuries to the poultry as result from fluttering after the poultry passes the killer station are reduced and picking is facilitated.

4. The structure set forth in claim 3, wherein said elongated electrode plate means is positioned in the processing line following and closely adjacent the killer station.

References Cited

UNITED STATES PATENTS

| | | | |
|---|---|---|---|
| 2,306,773 | 12/1942 | Biffinger | 17—11 |
| 2,335,993 | 12/1943 | Bland | 17—11 |
| 2,621,362 | 12/1952 | Cosden | 17—11 |
| 2,814,068 | 11/1957 | Pitts | 17—11 |
| 2,879,539 | 3/1959 | Cervin | 17—11 |

FOREIGN PATENTS 298,269  11/1965  Netherlands.

LUCIE H. LAUDENSLAGER, Primary Examiner

U.S. Cl. X.R.

17—1